No. 877,899.
PATENTED FEB. 4, 1908.
C. R. BOWEN, Jr.
COTTON SCRAPE.
APPLICATION FILED AUG. 30, 1907.
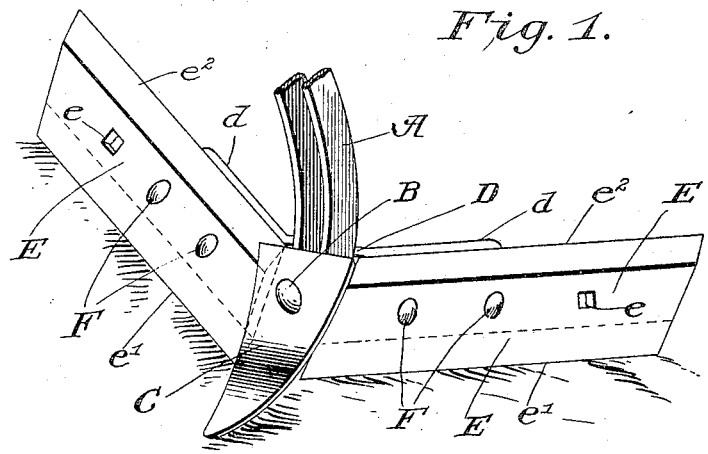
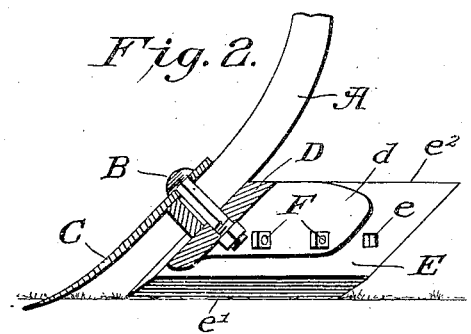
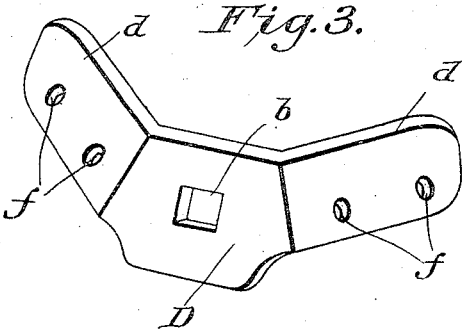
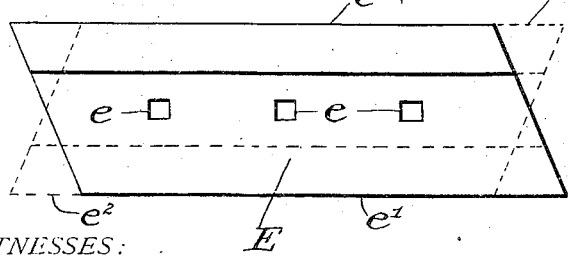
WITNESSES:
INVENTOR
Charles Rudolph Bowen Jr.
BY
his Attorneys

UNITED STATES PATENT OFFICE.

CHARLES RUDOLPH BOWEN, JR., OF JONES COUNTY, GEORGIA.

COTTON-SCRAPE.

No. 877,899.  Specification of Letters Patent.  Patented Feb. 4, 1908.

Application filed August 30, 1907. Serial No. 390,736.

*To all whom it may concern:*

Be it known that I, CHARLES RUDOLPH BOWEN, Jr., a citizen of the United States, residing in the county of Jones and State of Georgia, have invented certain new and useful Improvements in Cotton-Scrapes; and I do hereby declare the following to be a full, clear, and exact description of the invention, such as will enable others skilled in the art to which it appertains to make and use the same.

My invention relates to that class of plowshares or attachments for plows known as scrapes or sweeps, used principally for the light cultivation of cotton by scraping off the surface between the rows of plants to destroy the weeds and foreign growths which spring up therein.

The main object of the invention is to provide an improved scrape-attachment with reversible and interchangeable cutting blades or wings, whereby the mode of exchanging the said blades or wings secures therefrom the greatest possible amount of use and wear, while the blades when worn can be detached and replaced by others upon the same scrape-arm.

Another object is to provide a scrape of this character wherein the cutting wings or blades, besides setting at the necessary angle for satisfactory working, are effectively backed and braced by the frog or scrape-arm on which they are secured, making a strong construction and as perfect as an integral scrape-plow.

A further object is to provide a scrape of this character adapted for ready attachment to the ordinary plow-stocks or standards already in use in the cotton belt, avoiding the necessity of providing any special kind of standard.

These objects are attained by means substantially as illustrated in the accompanying drawings, which form a part of this specification, and wherein:

Figure 1 is a perspective view of my improved scrape-attachment applied to a plow-stock well known in the cotton belt. Fig. 2 is a medial vertical section thereof. Fig. 3 is a perspective view of the frog or scrape-arm on which the cutting blades or wings are detachably and interchangeably affixed. Fig. 4 is a face view of one of said blades or wings, with dotted lines indicating a reversed position of the same. Fig. 5 is an end view of the subject-matter of Fig. 4.

Referring to said drawings, the letter A denotes a plow-stock or standard commonly used in the cotton belt, as for example the Haiman plow-standard disclosed in U. S. Reissued Letters Patent No. 7,724, dated June 5, 1877. On the foot of said standard at the front thereof, is secured by a bolt B any suitable plow-point, shovel or cultivator-blade C, which is desirably used in conjunction with the scrape.

Secured to the foot of the standard from behind, preferably by the same bolt B that holds the shovel-blade, is the scrape-attachment which comprises a central scrape-arm or frog D and opposite lateral scraper-blades or wings E, E detachably affixed thereto. Said frog D is itself of approximately the form of a miniature scrape; that is to say, it consists of lateral rearwardly-diverging arms $d$ extending from a flat-faced central portion, which latter is provided with the bolt-hole $b$ for reception of the bolt B. The scraper-blades or wings E are rhomboidal, and they are affixed by bolts F, longitudinally of and to the arms $d$ of the frog, with the front points or proximate ends of the blade adjacent to the standard A, whereby said ends are practically covered by the front plow-point or shovel C. Said blades or wings E are each provided with double and reverse cutting edges, that is their upper and lower longitudinal edges are respectively beveled for sharpening on opposite sides, as indicated at $e'$ and $e^2$; and in use said blades are adapted to be transposed to opposite sides and reversed. For this purpose, the blades, being longer than the arms $d$ of the frog D, are each made with an alined series of bolt-holes $e$ so arranged that, whether the blade is secured at one side of the frog or at the other side in reversed position, two of said bolt-holes $e$ will register with the bolt-holes $f$ in the arms $d$. In the present instance, the blades are provided each with three equidistant bolt-holes, the outer ones of which are also substantially equidistant from the two ends of the blade; so that the middle hole serves as a common fastening point in whichever position the blade is affixed. If a relatively longer blade were used (which may be done), there would need to be four bolt-holes $e$, two for one end of the blade and two for the other, to correspond with the two bolt-holes in each of the arms $d$.

To illustrate the mode of exchanging the blades, it is noted in Fig. 1 that the cutting edges $e'$ are down, while the cutting edges $e^2$ are at the top, the latter being also beveled on the reverse sides of the blades. Now when the lower cutting edges become dull, it is merely necessary to loosen the bolts F and transpose each blade E to the opposite side, reversing it to bring the cutting edges $e^2$ down.

In Fig. 4, the dotted lines indicate the reversed position of one of the blades which is shown in full lines. Hence not only can the set of blades be used twice as long before it becomes necessary to remove them for sharpening, but furthermore, the provision for exchanging the blades from side to side equalizes the wear and prolongs their life. It is a well known fact that in a scrape-plow the wear on the right-hand blade is greater than on the left, so that the one blade is prone to wear out faster than the other. But by exchanging the blades from side to side, this difficulty is obviated, the wear being equalized for both blades. Each time the pair of blades are sharpened, they are used first for one edge and then transposed and used on the reverse edge, and thus the wear and sharpening is equalized for both.

It is noted that the blades are placed lengthwise upon the arms $d$, and, instead of being bolted only at their front ends, are affixed by the spaced bolts F at a sufficient distance from the front ends of the blades to make a safe, secure attachment, and the arms $d$ afford a firm backing for the blades, obviating the necessity of any separate bracing devices, while yet holding the blades perfectly rigid and secure. At the same time, the arms $d$ do not interfere with the proper cutting function of the blades, for the latter are wider as well as longer than said arms, and, being arranged with their upper edges substantially level, with the upper edges of the arms, and the bolts F being placed substantially along the medial lines of the blades, the lower cutting edges have a sufficient dependence below the arms to properly perform their function. The frog D is also constructed to support the blades thereon at the proper position for satisfactory working. It will be noticed by reference to Fig. 3 that the arms $d$ extend not only backward but also upward relative to the central portion of the frog, and that the planes of the faces of said arms $d$ and plane of the central portion intersect on upwardly converging lines; whereby said arms not only recede rearwardly but have also a backward slant. The arrangement is such that when the frog is attached to the inclined foot of the plow-standard, bringing the arms $d$ and blades E to horizontal position, the blades have the proper divergence and slant for effective work without undue resistance and strain. The planes of the arms $d$ are desirably at an angle of approximately seventy-five degrees to each other, while the medial longitudinal lines of said arms are at an angle to each other of approximately one-hundred and sixty degrees, which angles give the proper set of the scraper blades or wings; it being understood, of course, that in operation the arms and blades are, by the inclination of the frog, held approximately horizontal, leaving the wings diverging at the aforesaid angle of seventy-five degrees and slanting at an angle of about forty-five degrees to the ground. It is a known fact that a scrape-plow will not work satisfactorily unless set at a particular angle, and this setting, although provided in one-piece scrapes, has not hitherto been effected in a scrape with detachable blades. The present construction however provides for setting of the blades at the requisite angles. As will be seen, the attachment is also adapted for application to the ordinary plow-standards used in the cotton belt, the foot of the standard being placed over the central part of the frog D between the front ends or points of the blades E, and under the shovel C.

I am aware that cotton-scrapes with wings or blades detachably secured on a central piece have heretofore been devised and known, and I make no claim broadly thereto; but

What I claim as my invention and desire to secure by Letters Patent of the United States is:

A scrape-attachment for plows comprising: a frog having a flat central portion and opposite lateral arms diverging rearwardly therefrom in a horizontal plane, said arms being each provided with two bolt-holes, and duplicate rhomboidal blades each having upper and lower cutting edges respectively beveled on opposite or reverse sides, said blades being respectively arranged substantially parallel with and detachably bolted on said arms, each blade having an alined medial series of at least three bolt-holes so arranged that from each end are similarly spaced two of such bolt-holes to receive the fastening bolts which engage in registering holes in said arms, the blades being thereby adapted to be transposed to opposite sides with their cutting edges reversed, substantially as described.

In testimony whereof I affix my signature, in presence of two witnesses.

CHARLES RUDOLPH BOWEN, JR.

Witnesses:
 L. D. MOORE,
 HUGH CHAMBERS.